Figure 4:
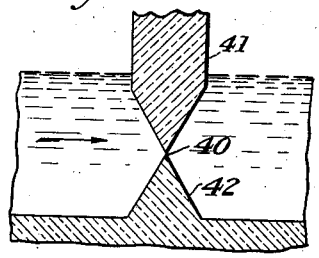

July 7, 1925.
G. E. HOWARD
CUT-OFF BLOCK OR VALVE FOR MOLTEN GLASS
Filed May 11, 1922 2 Sheets-Sheet 1
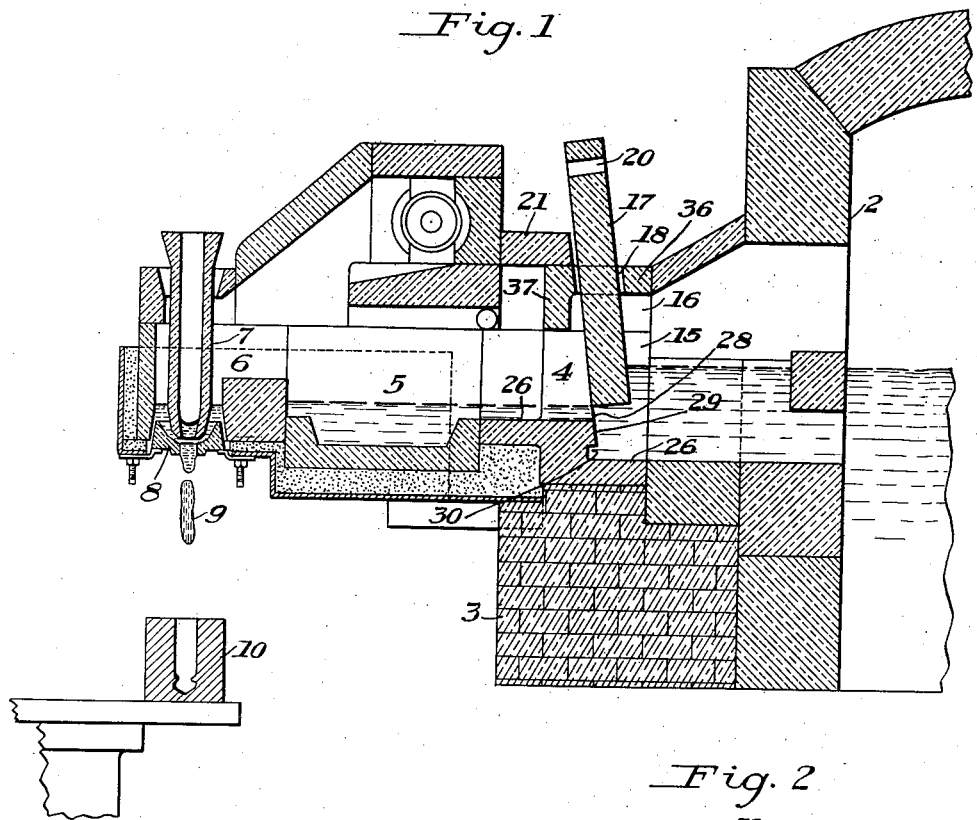
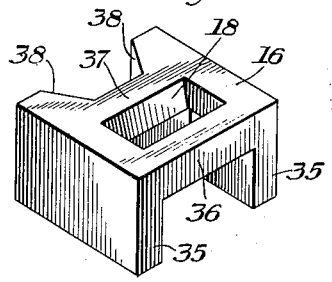
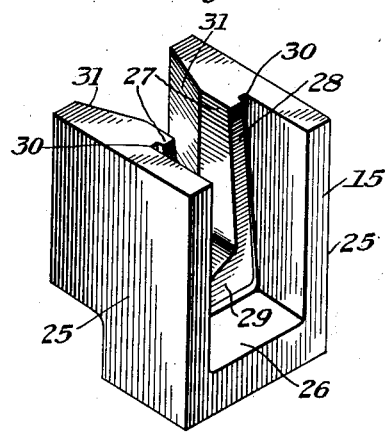
INVENTOR.
George E. Howard,
By Kay, Totten & Brown,
Attorneys July 7, 1925.

G. E. HOWARD

CUT-OFF BLOCK OR VALVE FOR MOLTEN GLASS

Filed May 11, 1922   2 Sheets-Sheet 2

INVENTOR.
George E. Howard.
By Kay, Totten & Brown,
Attorneys

Patented July 7, 1925.

1,544,987

UNITED STATES PATENT OFFICE.

GEORGE E. HOWARD, OF BUTLER, PENNSYLVANIA, ASSIGNOR TO HOWARD AUTOMATIC GLASS FEEDER COMPANY, OF BUTLER, PENNSYLVANIA, A CORPORATION OF PENNSYLVANIA.

CUT-OFF BLOCK OR VALVE FOR MOLTEN GLASS.

Application filed May 11, 1922. Serial No. 560,112.

*To all whom it may concern:*

Be it known that I, GEORGE E. HOWARD, a citizen of the United States, and resident of Butler, in the county of Butler and State of Pennsylvania, have invented a new and useful Improvement in Cut-Off Blocks or Valves for Molten Glass; and I do hereby declare the following to be a full, clear, and exact description thereof.

My invention relates to devices for shutting off and controlling the rate of flow of molten glass from a tank furnace to another receptacle, such as the forehearth employed with an automatic glass feeder.

One primary object of my invention is to provide a controlling device of the character indicated having means for compensating for wear and erosion, and for thereby increasing the effective life of the refractory parts in contact with the glass.

Another object of my invention is to provide a cutoff device for molten glass whereby the flow of glass may be shut off without chilling the glass, and may be completely stopped even after the parts have been subjected to considerable wear.

My invention is specifically, though not exclusively, designed for use as the back valve in the automatic glass feeder described and claimed in my copending application for Letters Patent, Serial No. 279,541, filed February 27, 1919. It will be understood, however, that my invention may also be employed in other connections, as for example, in controlling the flow of glass to the revolving tank used in the well-known Owens process of feeding glass to forming machines.

In the accompanying drawing, Fig. 1 is a longitudinal central sectional view showing the general construction of a glass feeder provided with a back valve constructed in accordance with my invention; Fig. 2 is a perspective view of the back valve block; Fig. 3 is a perspective view of the back valve block cover; Figs. 4 to 11, inclusive, are fragmentary diagrams illustrating the eroding action of glass in contact with various prior forms of controlling devices; and Figs. 12 to 14, inclusive, are fragmentary diagrams showing the manner in which my present invention compensates for such erosion.

In Fig. 1 of the drawing, the numeral 2 indicates the discharge end of a tank furnace of ordinary construction and the numeral 3 indicates the brick-work support for a feeding device which is of the same general type as that illustrated in my copending application, Serial No. 279,541, and which includes a back valve mechanism indicated generally by the numeral 4, an intermediate chamber 5, and a discharge chamber 6 in which a plunger 7 is reciprocated vertically, by means not herein shown, above a discharge opening formed in a bushing 8 through which the glass is discharged in gathers or gobs, one of which is shown at 9 falling toward a mold 10.

My present invention is concerned only with the back valve mechanism 4, the other structure of Fig. 1 being shown only for the purpose of illustrating this application of my invention. This valve mechanism comprises a valve block 15 shown in perspective in Fig. 2, a valve-block cover 16 which rests on the top of the valve block 15, and which is shown in perspective in Fig. 3, and a flat valve member or slab 17 which extends through an opening 18 in the cover 16 and is suspended adjustably by suitable suspension means engaging an opening 20. Such suspension means may be of any usual or desired construction, and it is not deemed necessary to illustrate them herein. A removable block 21 rests on the top of the cover 16 and on the adjacent walls of the feeder, and affords access to the interior of the valve chamber for inspection or repair. All of the parts of the valve, including the block 15, the block-cover 16, the movable slab 17, and the cover top 21 are composed of fire-clay or other desired refractory material.

As best shown in Fig. 2, the valve block 15 is composed of two vertical side walls 25 united by a bottom 26. Formed integral with the side walls 25 are two internal flanges 27, the front faces of which are inclined, as shown at 28, and are joined at their lower ends by a flat surface 29, the surfaces 28 and 29 forming an inclined flat seat against which rests the rear surface of the slab 17. A U-shaped recess 30 extends around the surfaces 28 and 29, which therefore stand out from the main body of fire clay composing the block.

Back of the valve seat formed by the surfaces 28 and 29, the inner surfaces of the flanges 27 unite with outwardly flaring surfaces 31 which form the outlet from the valve. The bottom 26 of the valve block is made in two levels, its upper level at the inlet being flush with the under side of the recess 30, and its upper level back of the valve seat being flush with the upper edge of the surfaces 29.

The block cover 16, as best shown in Fig. 3, is composed of two vertical side walls 35 spaced apart the proper distance to fit upon the top of the block 15, the side walls 35 being joined by members 36 and 37 which are spaced apart to form the opening 18 for the slab 17. Back of the transverse members 37 the side walls 16 are flared, as shown at 38, to conform to the flaring surfaces 31 of the valve block. The slab 17 is narrow enough to pass through the opening 18 in the block cover 16 and this opening 18, as shown on Fig. 3, is of less width than the internal width of the stationary valve member 15. The slab 17, therefore, seats upon the inclined surfaces 28 without touching the inner walls of the valve member 15.

For an understanding of the advantages and novel features of the cutoff block described above, it will be noted that when clay parts are immersed in molten glass which has been finished and plained, the glass tends to flux or erode the clay, this fluxing effect being due to the ability of molten glass to dissolve a certain amount of the alumina contained in the clay. This fluxing or dissolving effect is greatly increased when the molten glass flows over a clay surface or past the edge of a clay block, since fresh glass is continually brought into contact with the clay. Also, the fluxing effect greatly increases with the temperature of the glass, especially at high temperatures, and also increases rapidly with increase in the velocity with which the glass flows in contact with the clay.

Another factor in the problem of controlling the flow of glass by means of clay parts is that valve members made of clay or other refractory plastic materials can never fit together as perfectly as the metal surfaces of valves which are employed for handling cold liquids. Also, even the most carefully prepared clay wears away unevenly in contact with flowing glass, by reason of the stream effects which are present in the glass, and also because of variations in the composition of the clay.

Figure 5:
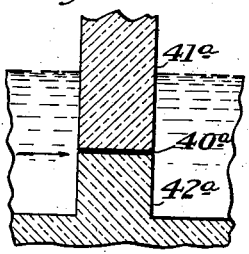

Molten glass will exude through a small opening if such opening is at the junction of two sharp edges, whereas it will not exude if the opening has an appreciable length. This is illustrated in Figs. 4 and 5. In Fig. 4 the glass at the small opening 40 between the clay members 41 and 42 will readily pass through the opening 40 because the glass at this point is kept practically as hot as the main body of the glass, since the loss of heat to the somewhat colder members 41 and 42 is small. In Fig. 5, however, the glass will not pass through the relatively long and narrow opening $40^a$ between the members $41^a$ and $42^a$, because the loss of heat causes the glass to clog in the opening and either prevents or greatly reduces the escape of the glass, particularly since the members $41^a$ and $42^a$ always have one side cooler than the other, and the flow of heat from the hot side to the cool side keeps the members at a lower temperature than the glass.

Another important feature of any glass-controlling valve or shutoff is that close contact must be maintained between the valve members after wear takes place through erosion or through mechanical abrasion.

It follows from the above considerations that the fundamental requirements for a glass-controlling valve of long life are: first, that the temperature of the clay parts be kept as low as possible; second, that the glass be caused to traverse the valve at as low a velocity as possible; third, that the glass-controlling members shall engage each other upon a surface rather than an edge; and fourth, that some means be employed for compensating for the wear which necessarily occurs.

Figure 6:
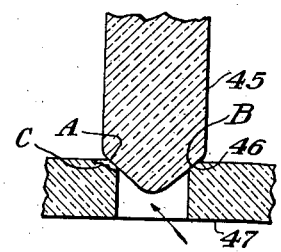
Figure 7:
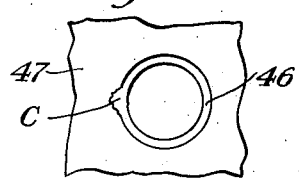
Figure 8:
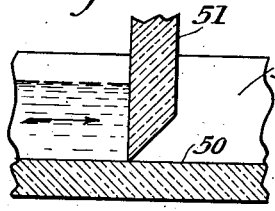
Figure 9:
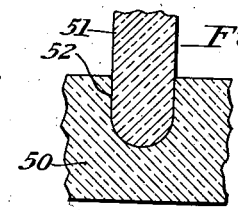
Figure 10:
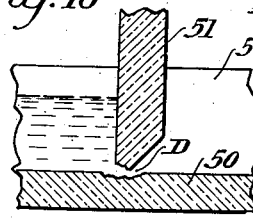
Figure 11:
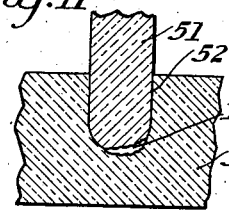

The valves heretofore used for controlling the flow of glass have been of two general types, in one of which, as illustrated in Figs. 6 and 7, while the other is illustrated in Figs. 8 to 11. In the type shown in Figs. 6 and 7, the glass flows upwardly through an opening which is closed by means of a circular plug 45, the tapering lower edges of which are made to conform as nearly as possible to the shape of a curved seat 46 formed in a clay seated block 47. When these clay parts are new and carefully fitted the glass is prevented from flowing upwardly around the plug. However, when the plug is raised and some other glass is allowed to flow, the glass travels more rapidly at some point such as at A than at the point B, or the resistance of the clay to erosion is greater at one point than another, and the wear due to erosion is therefore greater at some point A. Consequently, both the plug and the seat are worn away unevenly, producing a permanent opening C which permits the glass to flow even when the plug is seated as tightly as possible on the less worn portions.

The other well-known type of glass valve, shown in Figs. 8 to 11 consists of a refractory channeled member 50, and a gate 51 which is made to fit the channel 52 in the member 50. This form of valve is glass-tight when the parts are new, but the eroding action of the glass described above causes uneven wear immediately below the gate 51, producing the appearance shown at D, Figs. 10 and 11, and providing a permanent opening through which the glass flows even when the gate 51 is seated as tightly as possible on its other less worn portions.

Figure 12:
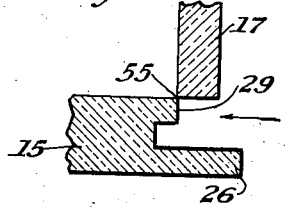
Figure 13:
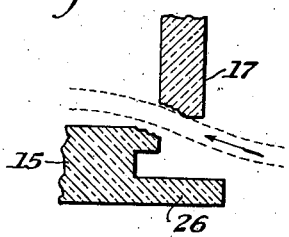
Figure 14:
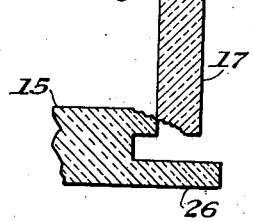

Figs. 12 to 14 show, in contrast to the preceding figures, the manner in which my present invention compensates for wear. When the parts are new the slab 17 will completely close the opening through the block 15 as soon as the lower end of the slab comes in contact with the vertical surface 29. In the normal operation of the apparatus, the slab is raised somewhat and the flowing glass eats away the corners of the slab and the block, producing somewhat the appearance shown in Fig. 13. This, however, does not prevent the valve from closing tightly, for it is only necessary to lower the slab 17 somewhat further than when the parts are new, so that fresh unworn surfaces are brought together, as shown in Fig. 14.

When the valve member 17 is raised slightly the velocity of the glass is greatest at the exposed edges 55, Fig. 12, while in the glass farther removed from the edges 55 the section of the flowing glass increases rapidly, with proportional decrease in velocity and cutting power.

Fig. 13 also shows in dotted lines the tendency of molten glass to flow in streaks. Glass varies greatly in viscosity and tends to travel in hot streaks outside of which the glass is often inert and travels very slowly. Therefore, the maximum cutting or eroding effect of the glass is exerted upon the clay parts which are in contact with this hot streak, which contributes to produce the eroded effect shown in Fig. 13.

Considerable variation may be made in the shape of the meeting edges of the slab 17 and the surface 29 of the block. The theoretically ideal condition would be to have the lower end of the slab V-shaped and to make the upper edge of the surface 29 of the same V-shape as the end of the slab, in order that the edge wear may be as uniform as possible. Such a V-shaped edge of the surface 29 is shown in Fig. 2. In practice, however, it is found that a square opening will be substantially as satisfactory as a V-shaped opening, since practically all of the wear occurs on the lower edges of the valve and the valve seat, and scarcely any on the sides of the valve and the valve seat.

As shown on the drawing, the valve member or slab 17 is inclined somewhat in order that it may tend to seat itself by gravity upon its bearing surfaces in the block 15. This is not always necessary, however, as the pressure of the glass may be relied upon to keep the valve member upon its seat, assisted, if desired, by suitable guides.

Another advantage of the construction herein shown is that if cracks should develop in the body of the valve block, such cracks are not likely to permit the glass to leak, since the slab 17 shuts off nearly the entire section of the flow and therefore only a small area of the block is in contact with the glass when the valve is closed. The only cracks which could cause leakage around the valve are tortuous cracks at the edges of the valve seat. Since these portions of the block are colder than the glass, the glass entering said cracks will tend to freeze and check the flow.

It will be noted that when the valve is closed most of the engaging or sealing surfaces of the sliding block and its seat are out of contact with the glass. This increases the durability of the valve by preventing erosion of the seating surfaces while the valve is closed.

It will also be observed that the cover block 16 and the block 21 are so arranged as to provide a confined combustion space over the glass at the valve. This assists in keeping the block from chilling and sticking, and also prevents the valve from unduly chilling the glass which flows past it. The opening 18 in the cover 16 is sufficiently larger than the movable valve 17 to provide space between the valve member and the walls of the opening, as shown in Fig. 1 of the drawing. This space allows the valve to work without contacting with the refractory cover blocks and also permits a limited escape of hot gases when the furnace is operated with a "sting-out" of plus pressure.

My invention may be applied not only to constructions where the glass flows horizontally and the movable valve member is raised and lowered, but also to constructions where the movable valve member moves laterally, in which case the glass may flow either horizontally, upwardly or downwardly. It will therefore be understood that my invention is limited only by the scope of the appended claims.

I claim as my invention:

1. A cut-off block or valve for molten glass comprising a stationary member of refractory material having a flat surface, and a movable member of refractory material disposed on the intake side of said stationary member and having a flat surface engaging the said flat surface of said stationary member, the said members having a substantial range of adjustment beyond their initial closing position, and being capable of wholly cutting off the flow of glass throughout said range of adjustment.

2. A cutoff block or valve for molten glass comprising a stationary member of refractory material having an opening for the flow of glass and having a flat surface adjacent to said opening and extending transversely to the direction in which the glass flows therethrough, and a slidable valve member of refractory material disposed on the intake side of said stationary members, said slidable member being adapted to rest flat against and slide upon said surface and to shut off the flow of glass through said opening.

3. A cutoff block or valve for molten glass comprising a stationary member of refractory material having an opening for the flow of glass and having flat surfaces below and at the sides of said opening, the said surfaces extending transversely to the direction in which the glass flows through said opening, and a slidable valve member of refractory material disposed on the intake side of said stationary member, said slidable member being adapted to rest flat against and slide upon said surfaces and to shut off the flow of glass through said opening when in engagement with the surface below said opening.

4. A cutoff block or valve for molten glass comprising a stationary member of refractory material having an opening through which glass may flow in a generally horizontal direction, and having a flat surface adjacent to said opening and extending transversely to the direction in which the glass flows therethrough, and a slidable valve member of refractory material adapted to rest flat against said surface and to control the flow of glass through said opening, the said surface and said valve member being inclined upwardly in the direction in which the glass flows through said opening.

5. A cutoff block or valve for molten glass comprising a stationary member of refractory material having an opening through which glass may flow in a generally horizontal direction and having flat surfaces disposed below and at the sides of said opening and extending transversely to the direction in which the glass flows therethrough, and a slidable valve member of refractory material adapted to rest flat against said surfaces and to shut off the flow of glass when in engagement with the said surface which is below said opening, the said valve member and the said surfaces being inclined upwardly in the direction in which the glass flows through said opening.

6. A cutoff block or valve for molten glass comprising a stationary valve block of refractory material having a channel through which glass may flow in a generally horizontal direction, said channel being of greater depth than the depth of the flowing glass, a valve seat within said block and having bearing surfaces adjacent to said channel, and a movable valve member of refractory material resting slidably against said surfaces and adjustable thereon.

7. A cutoff block or valve for molten glass comprising a stationary valve block of refractory material having a channel through which glass may flow in a generally horizontal direction, opposed flanges formed within said block adjacent to said channel, a U-shaped valve seat projecting from said flanges and spaced from the sides and bottom of said block, and a movable valve member of refractory material resting flat against said valve seat and adjustable thereon.

8. A cutoff block or valve for molten glass comprising a stationary valve block of refractory material having a channel through which glass may flow in a generally horizontal direction, opposed flanges formed within said block adjacent to said channel, a U-shaped valve seat projecting from said flanges and spaced from the sides and bottom of said block, and a movable valve member of refractory material resting flat against said valve seat and adjustable thereon, the said valve seat and movable valve member being inclined upwardly in the direction in which the glass flows through said channel.

9. A cutoff block or valve for molten glass comprising a stationary valve block of refractory material having vertical walls and open at the top, flanges formed within said block and having inclined edges forming a valve seat, the said valve seat being separated by a recess from the inner walls and bottom of said block, a cover for said block having an opening in its top, and a movable valve member of refractory material extending adjustably through said opening in said cover and resting flat against the said inclined valve seat.

10. A cutoff block or valve for molten glass comprising a stationary member of refractory material provided with a valve seat having an undercut recess adjacent thereto, and a movable valve member resting slidably upon said seat.

11. A cutoff block or valve for molten glass comprising a stationary member of refractory material provided with a U-shaped valve seat and with a U-shaped recess adjacent to said valve seat, and a movable valve member resting slidably upon said seat.

12. A cutoff block or valve for molten glass comprising a stationary member of refractory material having a channel for the flow of glass of greater depth than the flowing glass, said stationary member having a flat surface adjacent to said channel and extending transversely to the direction in which the glass flows therethrough, the said channel and the said surface being separated by a tapering edge, and a slidable valve member of refractory material disposed on the intake side of said stationary member, said slidable member being adapted to rest flat against and slide upon said surface and to shut off the flow of glass through said opening, the tapering shape of the said edge providing that the effective area of the said opening increases both in width and length when the said valve member is moved to open said valve.

13. A cutoff block or valve for molten glass comprising a stationary member of refractory material having an opening for the flow of glass and having a flat surface adjacent to said opening and extending transversely to the direction in which the glass flows therethrough, and a slidable valve member of refractory material adapted to rest flat against and slide upon said surface and to shut off the flow of glass through said opening, the said stationary member having an opening for the flow of glass communicating with said first-named opening and flaring outwardly in the direction in which the glass flows through said openings.

14. A cutoff block or valve for molten glass comprising a stationary member of refractory material having an opening for the flow of glass and having a flat surface adjacent to said opening and extending transversely to the direction in which the glass flows therethrough, a movable refractory member disposed on the intake side of said stationary member, and adapted to rest flat against and slide upon said surface and to shut off the flow of glass through said opening, and a cover member having an opening through which said movable member extends, the said cover member serving to provide an inclosed space adjacent to said sliding member.

15. A cutoff block or valve for molten glass comprising a stationary member of refractory material having an opening for the flow of glass and having a flat surface adjacent to said opening and extending transversely to the direction in which the glass flows therethrough, a refractory member adapted to rest flat against and slide upon said surface and to shut off the flow of glass through said opening, and a cover member adjacent to said slidable member, the said cover member serving to provide an inclosed space adjacent to said sliding member, and having an opening of less width than the internal width of the said stationary member for admitting the said slidable valve member.

16. In glass feeding apparatus, the combination of a discharge chamber having a discharge outlet adapted for communication with a tank furnace or the like, a vertically reciprocating plunger member for controlling the discharge of glass from said outlet, and an inclined slidable gate for controlling the admission of glass into said discharge chamber.

17. A cut-off block or valve for molten glass comprising a stationary member of refractory material having a seating surface and a movable member of refractory material disposed on the intake side of said stationary member and having a seating surface engaging the said seating surface of said stationary member, the said movable member having a substantial range of adjustment beyond an initial closing position, and being capable of wholly cutting off the flow of glass throughout said range of adjustment.

18. A cut-off block or valve for molten glass comprising a stationary member of refractory material having a seating surface, a movable member of refractory material disposed on the intake side of said stationary member and having a seating surface engaging the said seating surface of said stationary member, the said movable member having a substantial range of adjustment beyond an initial closing position, and being capable of wholly cutting off the flow of glass throughout said range of adjustment, and a cover member disposed above said stationary member and having an opening to admit said movable member, the said opening being sufficiently larger than the said movable member to provide space between said movable member and the walls of said opening.

In testimony whereof I the said GEORGE E. HOWARD have hereunto set my hand.

GEORGE E. HOWARD.